(12) United States Patent
Ranganathan et al.

(10) Patent No.: US 11,966,410 B2
(45) Date of Patent: *Apr. 23, 2024

(54) SYSTEM AND METHOD FOR PROVIDING A HYBRID SET-BASED EXTRACT, LOAD, AND TRANSFORMATION OF DATA

(71) Applicant: Oracle International Corporation, Redwood Shores, CA (US)

(72) Inventors: Vijayakumar Ranganathan, Woodside, CA (US); Dmitriy Gertsman, San Jose, CA (US); Saugata Chowdhury, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,544

(22) Filed: Aug. 9, 2021

(65) Prior Publication Data
US 2021/0365468 A1 Nov. 25, 2021

Related U.S. Application Data

(63) Continuation of application No. 15/685,229, filed on Aug. 24, 2017, now Pat. No. 11,086,895.

(51) Int. Cl.
*G06F 16/25* (2019.01)
*G06F 9/52* (2006.01)
(Continued)

(52) U.S. Cl.
CPC ............ *G06F 16/254* (2019.01); *G06F 9/524* (2013.01); *G06F 12/1009* (2013.01); *G06F 16/2282* (2019.01); *G06F 16/283* (2019.01)

(58) Field of Classification Search
CPC .......................... G06F 16/254; G06F 16/2282
(Continued)

(56) References Cited

U.S. PATENT DOCUMENTS

| 6,012,066 A | 1/2000 | Discount |
| 6,078,925 A | 6/2000 | Anderson |

(Continued)

OTHER PUBLICATIONS

Oracle, Oracle® Business Intelligence Server Administration Guide Version 10.1.3.2, Copyright © 2006, Dec. 2006, 432 pages.
(Continued)

*Primary Examiner* — Kimberly L Wilson
(74) *Attorney, Agent, or Firm* — TUCKER ELLIS LLP (57) ABSTRACT

In accordance with an embodiment, described herein is a system and method for loading and transforming data to a cloud database, using a hybrid set-based extract, load, transform approach. During the loading and transforming of large amounts of data, from one or more data sources, a data synchronization application sends small batches of data, in parallel streams, to the database, which operates as a transformation engine to load the data. Each stream can be associated with a separate staging table in the database. For each staging table, the subset of data therein is transformed and loaded, before the next subset is processed. A transform and merge process operating at the database can then be used to transform and merge the data, from each of the staging tables, to the target table.

20 Claims, 6 Drawing Sheets

Related U.S. Application Data (60) Provisional application No. 62/503,701, filed on May 9, 2017.

(51) Int. Cl.
  *G06F 12/1009* (2016.01)
  *G06F 16/22* (2019.01)
  *G06F 16/28* (2019.01)

(58) Field of Classification Search
  USPC .......................................................... 707/602
  See application file for complete search history.

(56) References Cited

U.S. PATENT DOCUMENTS

| | | | |
|---|---|---|---|
| 6,356,900 B1 | 3/2002 | Egilsson | |
| 6,594,672 B1 | 7/2003 | Lampson | |
| 6,604,110 B1 | 8/2003 | Savage | |
| 6,684,207 B1 | 1/2004 | Greenfield | |
| 6,970,874 B2 | 11/2005 | Egilsson | |
| 7,010,523 B2 | 3/2006 | Greenfield | |
| 7,089,266 B2 | 8/2006 | Stolte | |
| 7,194,449 B2 | 3/2007 | Miao | |
| 7,275,024 B2 | 9/2007 | Yeh | |
| 7,318,216 B2 | 1/2008 | Diab | |
| 7,350,191 B1 | 3/2008 | Kompella | |
| 7,401,064 B1 | 7/2008 | Arone | |
| 7,426,499 B2 | 9/2008 | Eder | |
| 7,499,944 B2 | 3/2009 | Higuchi | |
| 7,676,478 B2 | 3/2010 | Rausch | |
| 7,680,767 B2 | 3/2010 | Adya | |
| 7,680,828 B2 | 3/2010 | Gorelik | |
| 7,693,917 B2 | 4/2010 | Charlot | |
| 7,716,167 B2 | 5/2010 | Colossi | |
| 7,720,803 B2 | 5/2010 | Unnebrink | |
| 7,747,563 B2 | 6/2010 | Gehring | |
| 7,779,036 B2 | 8/2010 | Subramanian | |
| 7,783,711 B2 | 8/2010 | Levasseur | |
| 7,953,694 B2 | 5/2011 | Colossi | |
| 8,086,598 B1 | 12/2011 | Lamb | |
| 8,099,392 B2 | 1/2012 | Paterson | |
| 8,104,025 B2 | 1/2012 | Hogg | |
| 8,140,463 B2 | 3/2012 | Robson | |
| 8,433,673 B2 | 4/2013 | Venkatasubramanian | |
| 8,443,338 B2 | 5/2013 | Cwalina | |
| 8,504,513 B2 | 8/2013 | Aski | |
| 8,671,091 B2 | 3/2014 | Cherniack | |
| 8,694,880 B2 | 4/2014 | Krasner | |
| 8,886,591 B2 | 11/2014 | McDonald | |
| 9,372,904 B2 * | 6/2016 | Dola | G06F 16/254 |
| 9,542,656 B2 | 1/2017 | Behnen | |
| 9,727,604 B2 | 8/2017 | Jin | |
| 10,346,374 B1 * | 7/2019 | Johnson | G06F 16/214 |
| 2001/0047372 A1 | 11/2001 | Gorelik | |
| 2002/0194167 A1 | 12/2002 | Bakalash | |
| 2003/0229610 A1 | 12/2003 | Van Treeck | |
| 2004/0083199 A1 | 4/2004 | Govindugari | |
| 2005/0033726 A1 | 2/2005 | Wu | |
| 2006/0059028 A1 | 3/2006 | Eder | |
| 2006/0112123 A1 | 5/2006 | Clark | |
| 2007/0255741 A1 | 11/2007 | Geiger | |
| 2008/0027769 A1 | 1/2008 | Eder | |
| 2008/0168082 A1 * | 7/2008 | Jin | G06F 8/20 707/999.102 |
| 2009/0018996 A1 | 1/2009 | Hunt | |
| 2009/0043778 A1 | 2/2009 | Jambunathan | |
| 2011/0004617 A1 | 1/2011 | Mineno | |
| 2014/0160138 A1 * | 6/2014 | Nalluri | G09G 5/001 345/541 |
| 2014/0279890 A1 * | 9/2014 | Srinivasan | G06F 16/254 707/626 |

OTHER PUBLICATIONS

Oracle, Oracle Application Development Framework Overview, An Oracle White Paper, Feb. 2006, Copyright © 2006, 11 pages.

Oracle, Oracle® Business Intelligence Cloud Service Data Sync, Getting Started, Release 2.2, Sep. 2016, Copyright © 2010, 2016, 6 pages.

Oracle, Oracle® Business Intelligence Cloud Service Data Sync, Read Me, Release 2.2, Sep. 2016, Copyright © 2016, 6 pages.

Harvey, Rosie et al., Oracle® Cloud, Preparing Data in Oracle Business Intelligence Cloud Service, E64760-07, Feb. 2017, Copyright © 2014, 2017, 282 pages.

Williams, Richard "Configuring the Data Sync Tool for BI Cloud Service (BICS)", Apr. 24, 2015, 20 pages.

Oracle, Loading Data with Oracle BI Cloud Service Data Sync, Tutorial, Copyright © 2015, 34 pages.

\* cited by examiner

SYSTEM AND METHOD FOR PROVIDING A HYBRID SET-BASED EXTRACT, LOAD, AND TRANSFORMATION OF DATA

CLAIM OF PRIORITY

This application is a continuation of and claims the benefit of priority to U.S. patent application Ser. No. 15/685,229, titled "SYSTEM AND METHOD FOR PROVIDING A HYBRID SET-BASED EXTRACT, LOAD, AND TRANSFORMATION OF DATA", filed Aug. 24, 2017, which application claims the benefit of priority to U.S. Provisional Patent Application No. 62/503,701, titled "SYSTEM AND METHOD FOR PROVIDING A HYBRID SET-BASED EXTRACT, LOAD, AND TRANSFORMATION OF DATA", filed May 9, 2017, each of which above patent applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to a system and method for loading and transforming data to a cloud database, using a hybrid set-based extract, load, transform approach.

BACKGROUND

Business intelligence (BI) tools that operate in cloud computing environments, for example, Oracle Business Intelligence Cloud Service (BICS) and Oracle Data Visualization Cloud Service (DVCS), are often designed to access data provided by a cloud database (for example, a database-as-a-service (DBaaS), or database cloud service).

However, during the loading of data, from one or more data sources, to a cloud database, there may be a need to prepare the data in some manner, so it can operate as a data warehouse. For example, the data may need to be extracted from a highly-normalized transactional system data source, and transformed into star schemas, to support analytic querying at the data warehouse.

The existing approaches for loading and transforming data to a cloud database generally rely on the use of a powerful middle-tier server for transforming the source data, and/or a database environment that provides plenty of available space for staging the data.

However, for databases that are hosted in the cloud, it may not be feasible to provide such processing capabilities or staging space. Accordingly, techniques that enable loading and transforming of large amounts of source data, to a cloud database, which can be used both with existing systems and with those that have lesser processing capabilities or staging space, would be beneficial.

SUMMARY

In accordance with an embodiment, described herein is a system and method for loading and transforming data to a cloud database, using a hybrid set-based extract, load, transform approach. During the loading and transforming of large amounts of data, from one or more data sources, a data synchronization application sends small batches of data, in parallel streams, to the database, which operates as a transformation engine to load the data. Each stream can be associated with a separate staging table in the database. For each staging table, the subset of data therein is transformed and loaded, before the next subset is processed. A transform and merge process operating at the database can then be used to transform and merge the data, from each of the staging tables, to the target table.

DETAILED DESCRIPTION

As described above, during the loading of data, from one or more data sources, to a cloud database, there may be a need to prepare the data in some manner; for example by extracting the data from a highly-normalized transactional system data source, and transforming it into star schemas, to support analytic querying.

Examples of environments that support data extract, load, and transformation to a cloud database include Oracle Data Sync, which enables uploading of an organization's on-premise data to a cloud database.

The following are two approaches that may be used to transform data loads:

ETL (Extract, Transform and Load): In this approach, the data is extracted from the source database, and flows through a middle-tier server where it is transformed. Any data that needs to be looked up from the target, typically gets cached on a local server. Once the data is transformed locally, it gets loaded into the target database. This approach typically requires a powerful middle-tier server where the transformation happens.

ELT (Extract, Load and Transform): In this approach, the data is extracted from the source database through the middle-tier server, and is loaded into a staging area of the target database as-is (without transformation). Then, it is transformed and into the final target table using the database as a transformation engine. This approach requires a powerful database as a target, with plenty of space for staging the data, generally at least twice as much (sometimes more) as the source data, during the load process. This approach also requires a lot of resources for larger transactions (for example, temp space to perform joins).

The typical ETL/ELT approaches are well-suited to loading data to an on-premise database, where space is generally not a limitation. However, such approaches are not as well-suited to loading to a database in a cloud computing environment (cloud environment), since they generally rely on the use of a powerful middle-tier server for transforming the source data, and/or a database environment that provides plenty of available space for staging the data.

Additionally, the typical ELT approach lacks frequent commit capabilities, thus requiring more redo and undo spaces. For example, a table with about 20 GB of data will generally require at-least 40 GB of disk space before the data can be updated to the target table during the load process. Should the transform include looking up values in other tables already existing in the target, it will also need more temp space to perform, e.g., hash joins, and sorting.

Hybrid Set-Based Extract, Load, Transform (Hybrid Set-Based ETL)

In accordance with an embodiment, described herein is a system and method for loading and transforming data to a cloud database, using a hybrid set-based extract, load, transform approach.

In accordance with an embodiment, the hybrid set-based approach builds upon a typical ELT approach, but without the heavy price paid in resources, and can be implemented with a generally lightweight middle-tier server, unlike that of the typical ETL approach.

Generally described, in accordance with an embodiment, with the hybrid set-based approach, smaller batches of data are streamed and are staged in a table in a target database, and the data is transformed and loaded on that small subset of data before the next set is processed.

In accordance with an embodiment, since writing to a cloud database can be slower than the reads, the write operation is parallelized to send data in a plurality ("n") of streams. Thus, the stage, instead of being in a single table, can also be in multiple tables one per stream, depending on how it is configured, thus increasing the overall write throughput. A single process transforms and merges the content to the target table from the stage area.

Additionally, in accordance with an embodiment, because the volume of data handled at once is smaller in size, the database can perform the transformations faster with very little disk space and memory.

Cloud Database Environments

Figure 1:
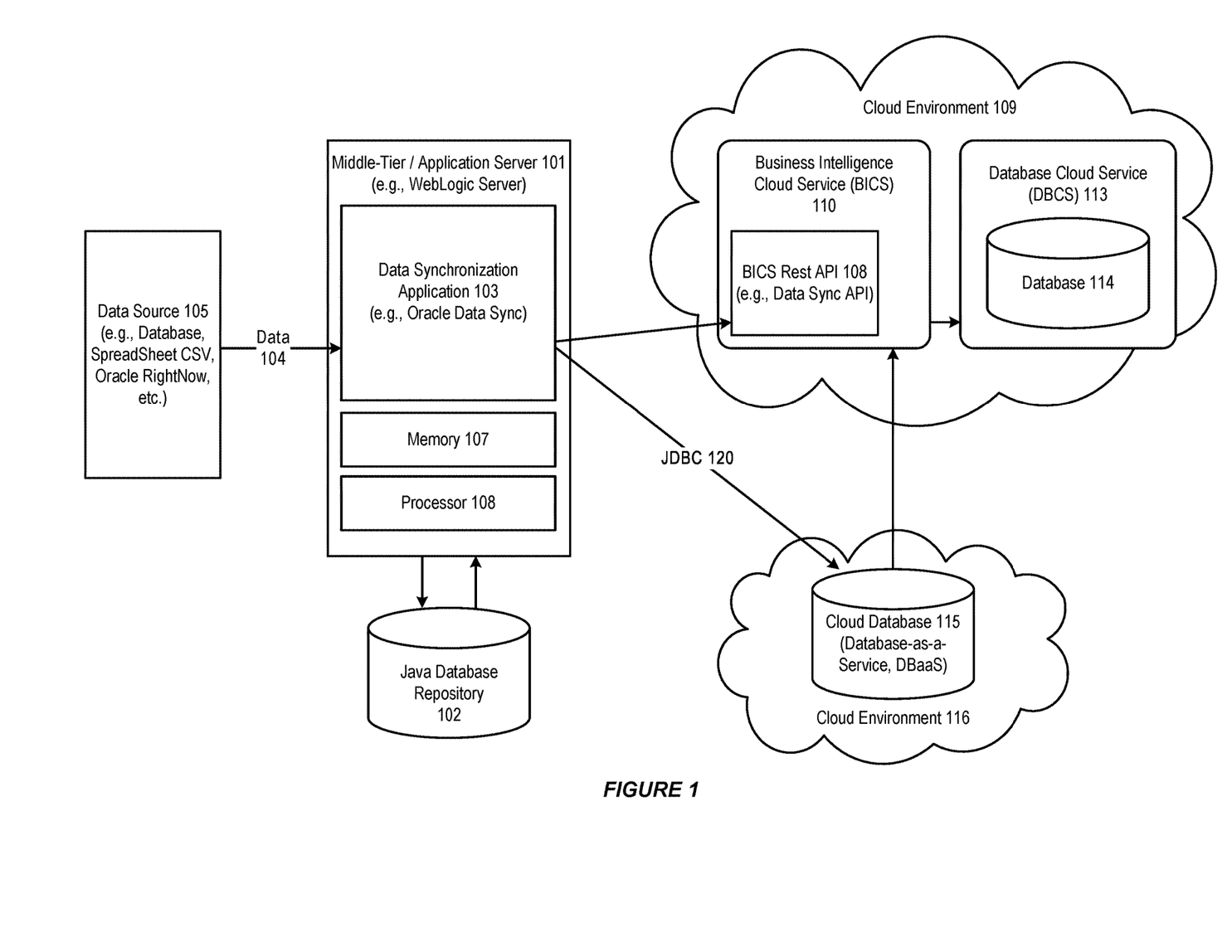
FIG. 1 illustrates a system for loading data to a cloud database environment, in accordance with an embodiment.

FIG. 1 illustrates a system for loading data to a cloud database environment, in accordance with an embodiment.

As illustrated in FIG. 1, in accordance with an embodiment, a data synchronization application 103, for example, an Oracle Data Sync or other component that enables loading of data to a cloud database, can run on a middle-tier or application server 101, to receive data 104 from one or more data sources 105, and load that data to, for example, a database cloud service (DBCS) 113 and database 114, provided in a cloud environment 109, and/or a database-as-a-service (DBaaS) 115 provided in the same or another cloud environment 116.

In accordance with an embodiment, a Java database or other repository 102 can be used to persist Java objects, for use during the loading of the data to the database. The data synchronization application can upload the data using, e.g., JDBC 120.

In accordance with an embodiment, the middle-tier/application server can further include a memory 107 and a processor 108; and can be provided, for example, as an on-premise system, or operate on a compute node in a cloud environment.

In accordance with an embodiment, the data uploaded to the DBCS, DBaaS, or other cloud database, can be used by a business intelligence cloud service (BIOS) 110, or other types of BI tools, to generate analysis or other types of reports on the data loaded to the database.

In accordance with an embodiment, the BIOS can expose a representational state transfer (REST) API 108, which enables the data synchronization application to communicate with the BIOS and/or the DBCS through the REST API.

As described above, during the loading of data to the cloud database, there may be a need to prepare the data in some manner, for use as a data warehouse. For example, the data may need to be extracted from a highly-normalized transactional system data source, and transformed into star schemas, to better support analytic querying at the data warehouse; tasks for which the typical ETL and ELT approaches may not be well-suited, since they generally rely on the use of a powerful middle-tier server for transforming the source data, and/or a database environment that provides plenty of available space for staging the data.

Use of Hybrid Set-Based ETL with a Cloud Database

Figure 2:
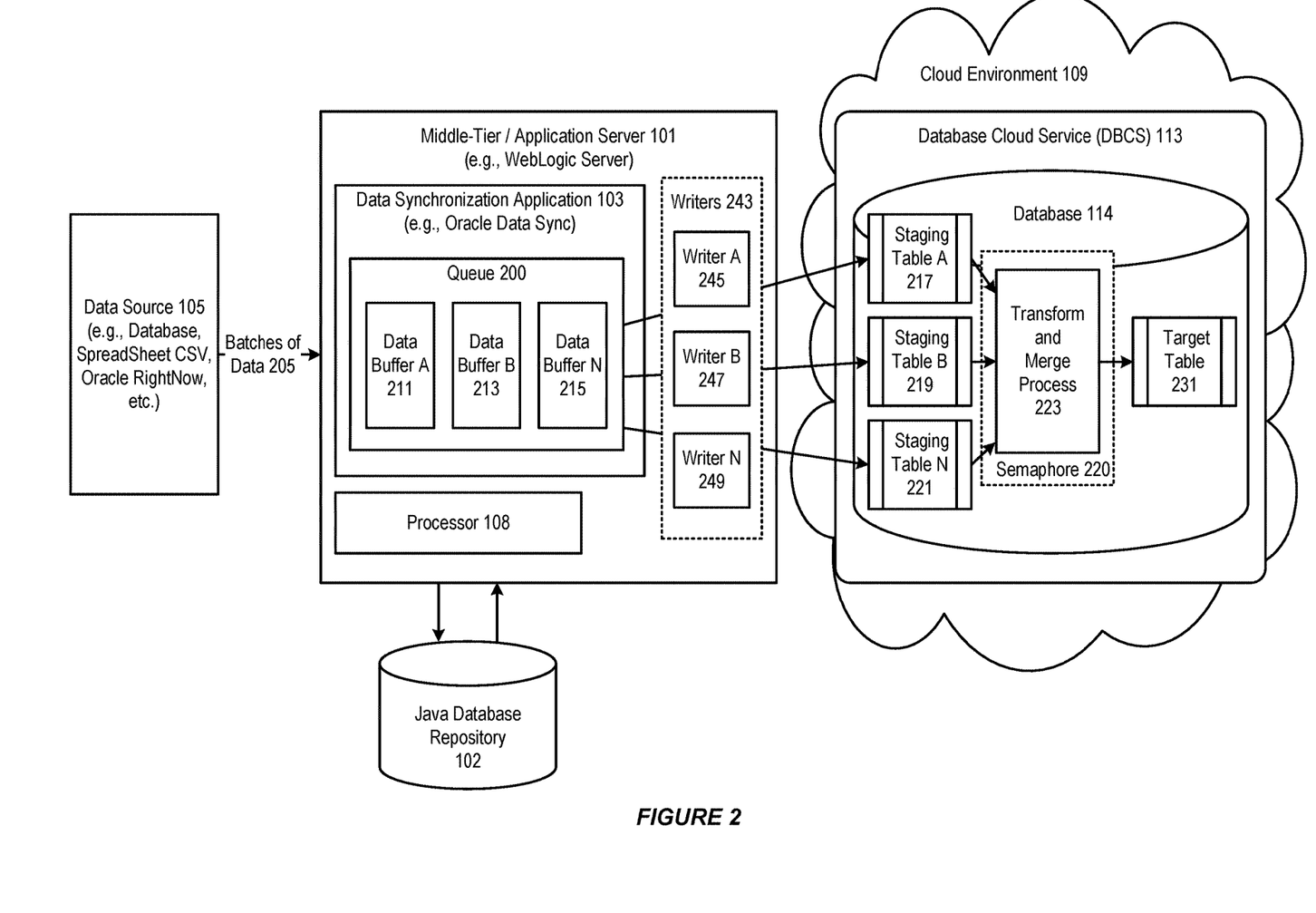
FIG. 2 further illustrates a system for loading data to a cloud database environment, in accordance with an embodiment.

FIG. 2 further illustrates a system for loading data to a cloud database environment, in accordance with an embodiment.

In accordance with an embodiment, the system can store data momentarily in memory on the middle-tier/application server, for example, as Java objects in data buffers. The writers can consume the data stored in the data buffers, and directly load the data to staging tables in parallel.

In accordance with an embodiment, during the loading and transforming of large amounts of data, from one or more data sources, a data synchronization application sends small batches of data, in parallel streams, to the database, which operates as a transformation engine to load the data.

In accordance with an embodiment, each stream can be associated with a separate staging table in the database.

In accordance with an embodiment, for each staging table, the subset of data therein is transformed and loaded, before the next subset is processed. A transform and merge process operating at the database can then be used to transform and merge the data, from each of the staging tables, to the target table.

FIG. 2 uses a DBCS as an example cloud environment, to which the system uploads data from a data source. The systems and methods described herein can be similarly used to upload the data from one or more data sources to other types of cloud environment, or to other types of databases or database services.

As illustrated in FIG. 2, data received from the data source can be transmitted in batches 205 to the middle-tier/application server, and stored in memory 107, for example as Java objects, in a plurality of data buffers in the memory, for example, data buffer A 211, data buffer B 213 and data buffer N 215.

In accordance with an embodiment, each data buffer can store a batch of data, for example, an array of 10,000 rows; and can be pushed into a queue 200 for consumption by one of the plurality of writers 243.

In accordance with an embodiment, the queue can be a FIFO (first-in, first-out) data structure, with the data buffer pushed into the queue first to be consumed first. There can be as many data buffers in the queue as there are writers. As such, the size of the queue (i.e. the number of data buffers in the queue) can be the same as the number of writers.

In accordance with an embodiment, each reader and writer can run on a separate thread. Further, the plurality of writers can run in parallel. Each writer can consume a data buffer from the queue, and upload the data in the data buffer to a staging table in the database cloud service.

For example, in accordance with an embodiment, a first writer A 245 can consume data buffer N, and update the data in the data buffer to staging table A 217; while a second writer B 247 can consume data buffer B, and upload the data in the data buffer to staging table B 219; and another writer N 249 can consume data buffer A, and upload the data in the data buffer to staging table N 221.

In accordance with an embodiment, as data batches created from the data source continue to be stored in the plurality of data buffers and pushed into the queue, the plurality of writers can keep loading the data in the plurality of data buffers, in a plurality of parallel data streams, to the plurality of staging tables in the database cloud service. The parallelized data streams can improve the write throughput.

In accordance with an embodiment, array inserts/updates with JDBC prepared statements can be used to write data to the staging tables. Transactions can be committed per batch.

In accordance with an embodiment, each staging table can be configured with a flush point, to determine when to flush the data in the staging table to a target table 231.

In accordance with an embodiment, a transform and merge process 223, for example as controlled by a semaphore 220, can then transform and load the data in the plurality of staging tables into the target table.

In accordance with an embodiment, only one transform and merge process can be used for the target table, although another transform and merge process may be used for another target table. Since the transform and merge process for the target table is controlled by a semaphore, data batches from only one staging table can be transformed and loaded into the target table at any given time, to avoid parallel updating of the target table with data from multiple staging tables.

In accordance with an embodiment, the systems and methods described herein can be used to load data to a cloud database and transform the data therein using a set-based/hybrid approach. While loading and transforming massive data into a database on the cloud, the system can use a combination of sending small batches of data in parallel streams, and the power of database as a transformation engine to optimally load the data, requiring much less resources.

In accordance with an embodiment, when writing to a table, the data synchronization application can send data in multiple streams in parallel, and data is written in parallel to the plurality of staging tables. In this case, there can be as many staging tables as the streams. The use of a single transform and merge process per target table helps to avoid conflicts and locking issues.

In accordance with an embodiment, advantages of the hybrid set-based extract, load, transform approach include that there are no joins involving too many rows, thus eliminating the need for expensive hash joins; and that, as the transformation happens in small batches, it needs very small additional space for stage data. This also helps achieve frequent commits, thus reducing the load on the database by reducing the size of transactions.

Additionally, by requiring less resources for transforming the data, cloud database customers can perform expensive data loads without requiring them to provide more powerful computing hardware. Because of the minimalistic footprint, not only do data loads happen faster, but more processing power is available to the database for the end users' analytic needs. This can help increase the adaptability of the cloud databases.

Figure 3:
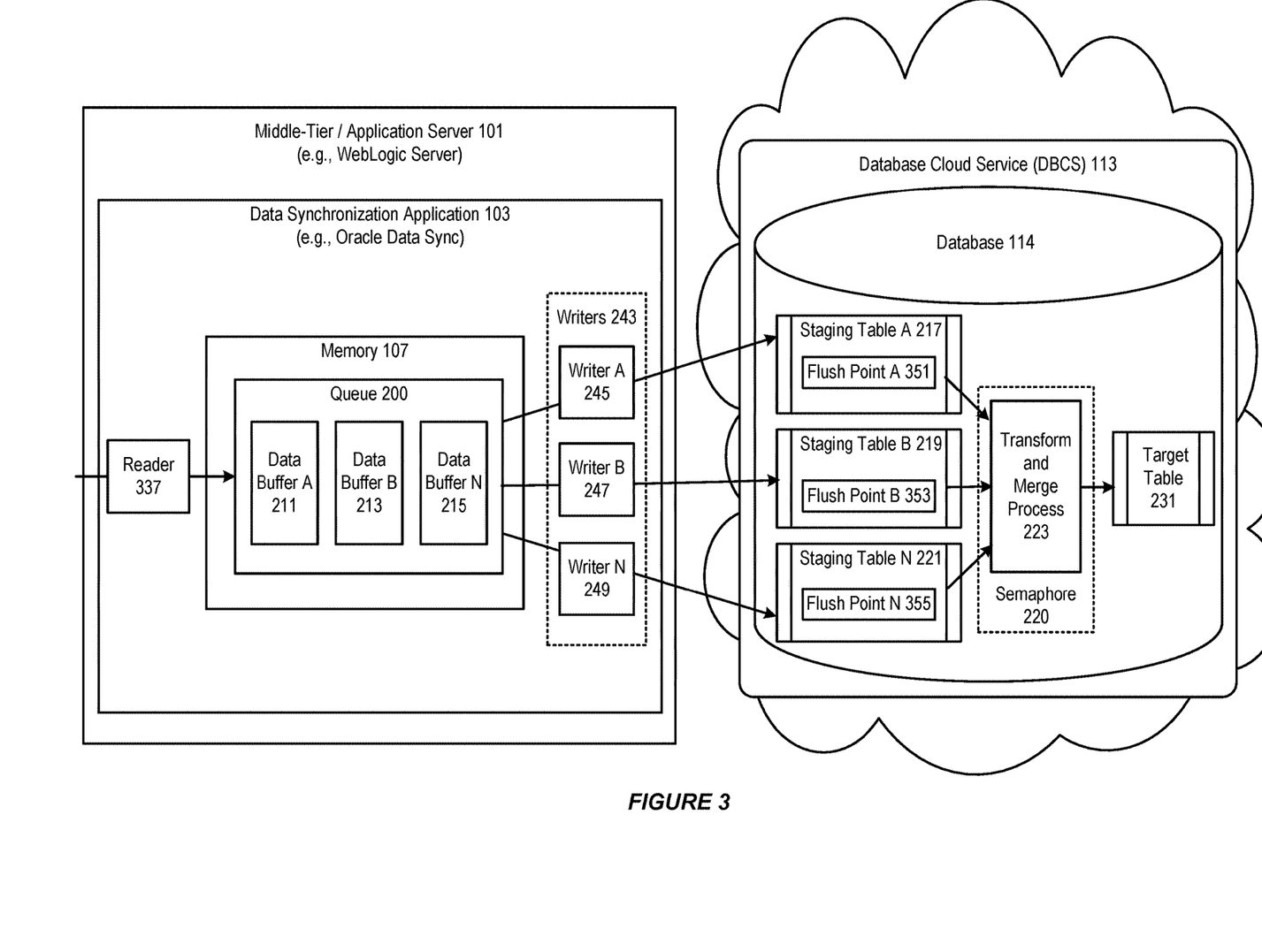
FIG. 3 further illustrates a system for loading data to a cloud database environment, in accordance with an embodiment.

FIG. 3 further illustrates a system for loading data to a cloud database environment, in accordance with an embodiment.

As shown in FIG. 3, a reader 337 can be provided in the data synchronization application to read data sets/batches from the data source into the plurality of data buffers.

In accordance with an embodiment, the data set/batches can be stored momentarily in the plurality of data buffers before being written in a plurality of parallel data streams into the staging tables by the plurality of writers. Each reader and writer can represent a data object in the data synchronization application.

As further shown in FIG. 3, each staging table can include a flush point, for example, flush point A in 351, flush point B 353, and flush point N 355. Each flush point can represent a numerical value that indicates when to flush the correspond staging table.

In accordance with an embodiment, when a data set (data batch), for example 1,000 records/rows, is written by a writer from a data buffer to a staging table, the data set may not be immediately transformed and merged into the target table. The system can first check whether the total record counts of the accumulated data in the staging table has reached the flush point for the staging table.

If the flush point is reached, the merge and transform process can be invoked to truncate the staging table, and transform and merge the staged data in the staging table into the target table. If the flush point is not reached, the writer can continue to write data from a data buffer in the queue to the staging table, until the record count of the accumulated staged data in the staging table reaches the flush point or until no more data exists in any data buffer in the queue. In either case, the transform and merge process can truncate the staging table, and transform and merge the staged data into the target table.

In accordance with an embodiment, a flush point for a staging table can be a value larger than the size of the data set written into the staging table. For example, the flush point can be a multiple of the size of the data set.

As such, a flush point can be used to adjust the size of data that is transformed and merged into the target table for each invocation of the transform and merge process. If the flush point for a staging table is set too high, more disk space and memory would be required when transforming and merging the staged data in the staging table. If the flush point is set too low, the transform and merge process would be invoked more frequently, which can result in consumption of more computing resources in the cloud database, e.g., memory and CPU cycles.

In accordance with an am embodiment, a flush point for a staging table can be set to the size of the data set written to the staging table. Wth such a flush point, as soon as a data set is written to the staging able, the transform and merge process can be invoked to transform the data and load it to the target table.

In accordance with an embodiment, when merging data from a staging table into the target table, the transform and merge process can convert the data into one or more prepared statements, and execute the prepared statements against the target database, thereby loading the data into the target database.

Figure 4:
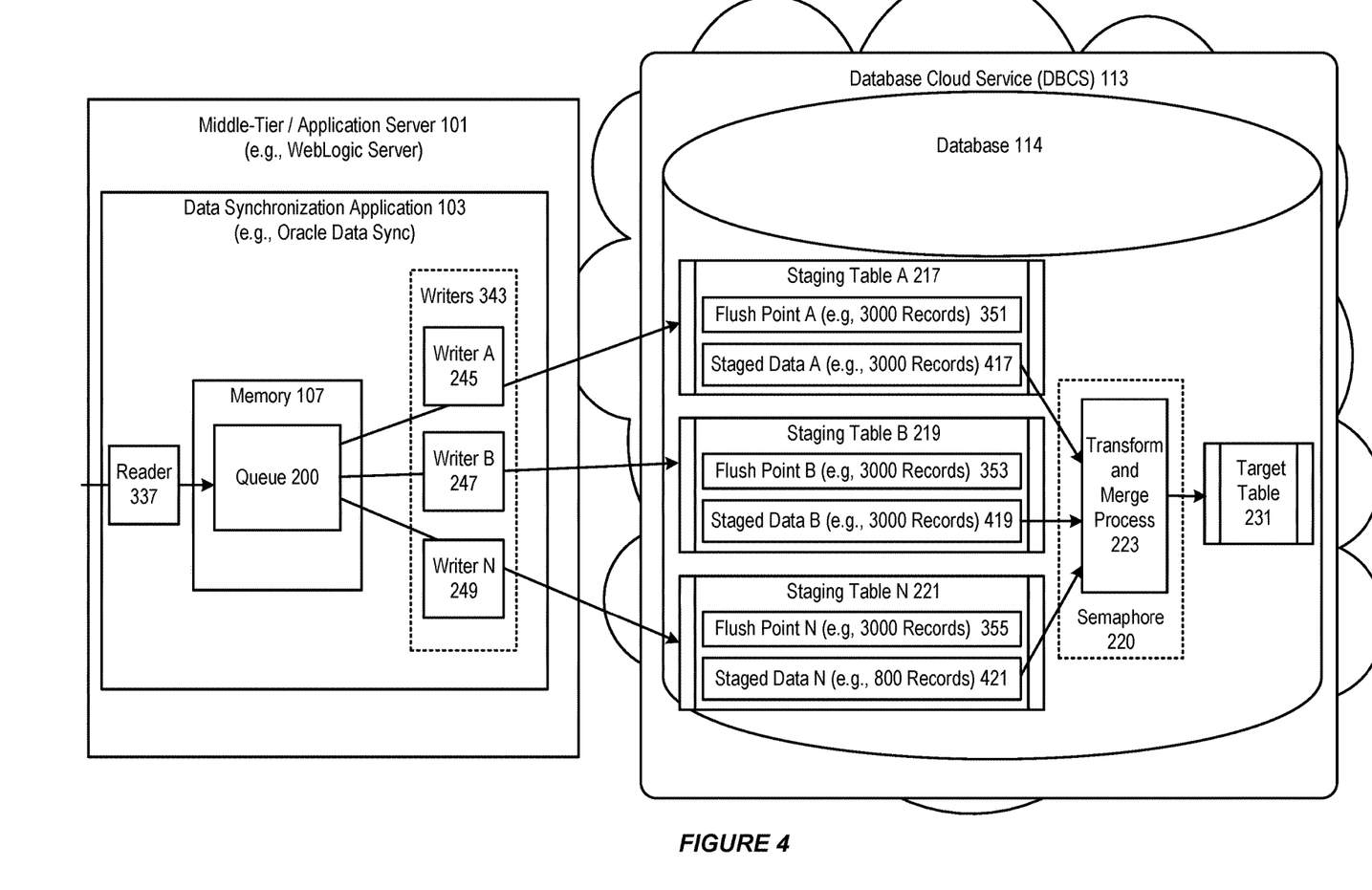
FIG. 4 further illustrates a system for loading data to a cloud database environment, in accordance with an embodiment.

FIG. 4 further illustrates a system for loading data to a cloud database environment, in accordance with an embodiment.

In accordance with an embodiment, the size of the data set can be smaller than the size of each of the flush points. For example, the data set can be set to 1000 records/rows, and each of the flush points can be set to 3,000 records.

Accordingly, when a set of data is written into a staging table 217, 219, 221, the transform and merge process 223 may not immediately be invoked. Only when the record count of the staged data 417, 419, 421 in a staging table 217, 219, 221 reaches the flush point 351, 353, 355, or when a writer cannot detect data in the queue to write to a staging table 217 219, 221 can the transform and merge process 223 be invoked.

In FIG. 4, the staged data 417, 419 in both staging table A 217 and staging table B 219 has reached a record/count of 3,000, and is ready to be merged into the target table 231. Although the record count of the staged data 421 (e.g., 800 records) in staging table N 221 is less than the flush point 355 of 3,000 records, the staged data 421 is similarly ready to be merged into the target table 231, since the 800 records are the only remaining records in the data source.

In accordance with an embodiment, each staging table 217, 219, 221 can invoke the single transform and merge process 223 in turn, in accordance with the semaphore 220 configured to control the single process. Allowing multiple instances of the transform and merge process 223 (e.g., a transform and merge engine) would create deadlocks and resource contentions at the target table 231.

Figure 5:
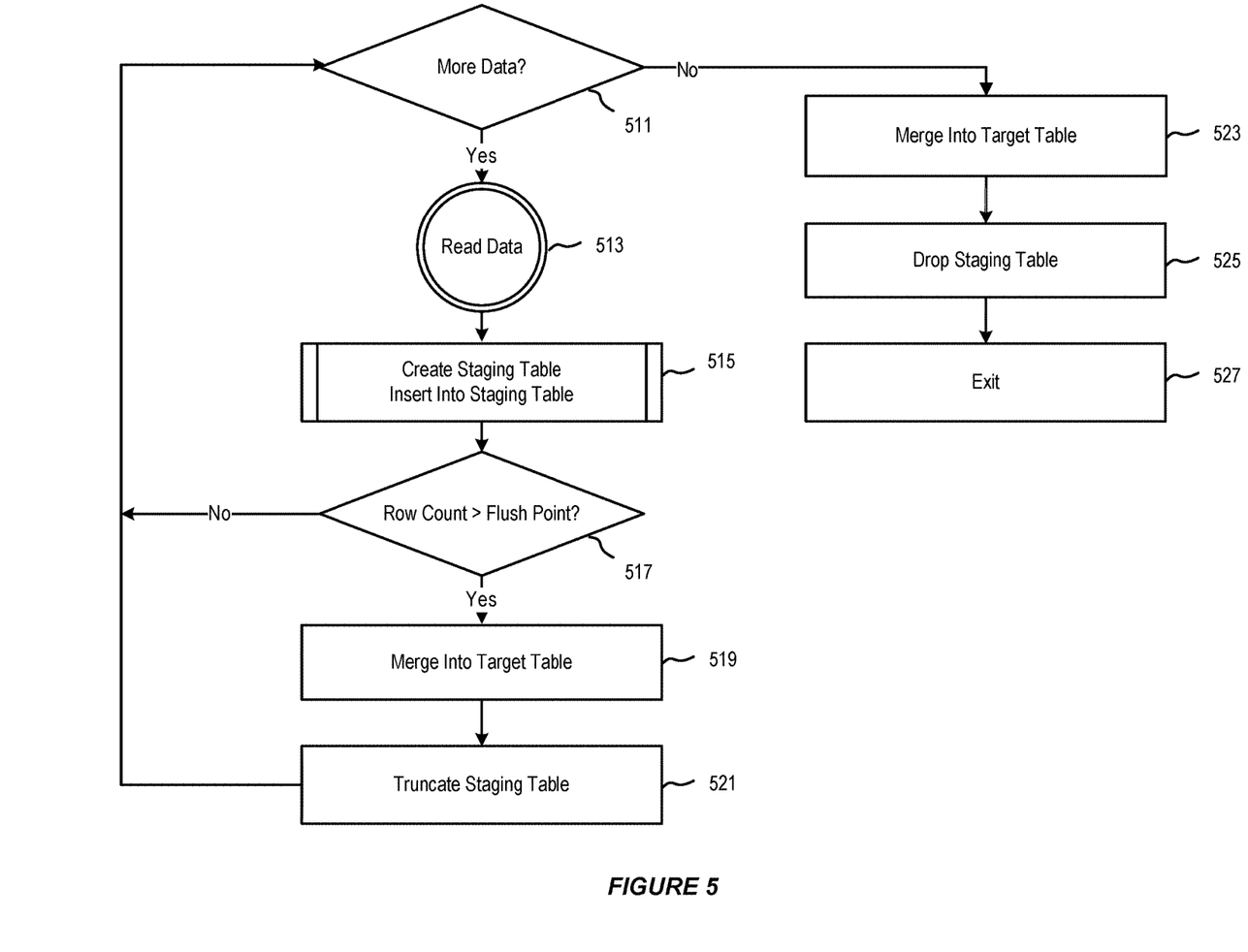
FIG. 5 illustrates a process for use in loading data to a cloud database environment, in accordance with an embodiment.

FIG. 5 illustrates a process for use in loading data to a cloud database environment, in accordance with an embodiment.

As illustrated in FIG. 5, (which generally illustrates loading of data using a a single writer and a single data stream to a single staging table; a similar approach can be used to load data using multiple writers and multiple parallel data streams to multiple staging tables) in accordance with an embodiment, at step 511, the system can check whether there is data in a queue at the middle-tier/application server.

If there is data in the queue, the system can read the data (step 513) from the queue.

At step 515, a staging table (stage) can be created for the data, and the data can be inserted into the staging table. The system can continue to read data from the queue, until no more data is found in any of the data buffers in the queue.

At step 517, when the row count in the staging table exceeds the configured flush point for the staging table, the system can flush the data in the staging table, and merge (step 519) the data into a target table.

At step 521, the staging table can be cleaned for storing more data from the queue.

In accordance with an embodiment, if there is no more data in any data buffer in the queue, the data in the staging table can be merged into the target table (step 523), the staging table can be dropped (step 525), and the execution of the process can exit (step 527).

Figure 6:
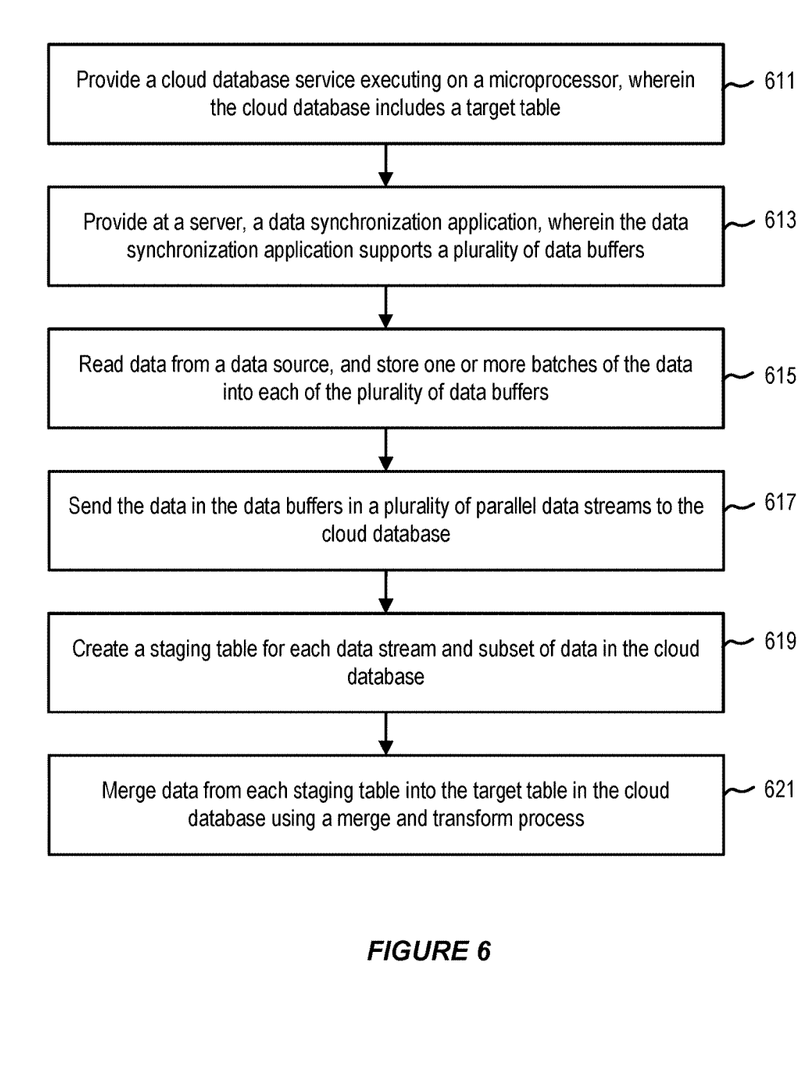
FIG. 6 illustrates a method for loading data to a cloud database environment, in accordance with an embodiment.

FIG. 6 illustrates a method for loading data to a cloud database environment, in accordance with an embodiment.

As illustrated in FIG. 6, at step 611, a cloud database executing on a microprocessor is provided, wherein the cloud database includes a target table.

At step 613, a data synchronization application is provided at a server, wherein the data synchronization application supports a plurality of data buffers.

At step 615, data is read from a data source, and one or batches of the data are stored into each of the plurality of data buffers.

At step 617, the data in the data buffers is sent in a plurality of parallel data streams to the cloud database.

At step 619, a staging table is created for each data stream, and subset of data, in the cloud database.

At step 621, data from each staging table is merged into the target table in the cloud database using a merge and transform process.

In accordance with an embodiment, the data synchronization application can push the data to the target table in small chunks (e.g., 10,000 rows at time). If a dataflow (e.g., a batch/set of data) contains expressions, a temporary staging table gets created on the target side, where the batch of data is first persisted. Once the staging table accumulates enough number of rows for flush, an ELT SQL (merge statement) can be generated and executed, which moves the data to the target table, passing the expressions to the target database to evaluate. Upon successful merge, the stage data can be deleted from a staging table, and the staging table can be used to store one or more additional sets of data.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for loading data to a cloud database, the system comprising:
   a microprocessor;
   a plurality of staging tables in the cloud database;
   a flush point configured for the plurality of staging tables, wherein a value of the flush point determines when to flush the data in the plurality of staging tables to a target table in the cloud database;
   a data synchronization application on a server executing on the microprocessor, wherein the data synchronization application uploads data from an associated data source in a plurality of parallel streams to the plurality of staging tables in the cloud database, each of the plurality of streams corresponding to one of the plurality of staging tables; and
   a semaphore that is set when each particular staging table of the plurality of staging tables reaches the configured flush point value, wherein the semaphore being set triggers a transform and merge process to merge the data from said each particular staging table into the target table by invoking a single transform and merge process in turn, wherein the value of the flush point is selected by the system for different invocations of the transform and merge process to provide adjustable size control of the data that is staged in each particular staging table to be transformed and merged into the target table.

2. The system of claim 1, wherein the semaphore is associated with the target table.

3. The system of claim 2, further comprising:
   a plurality of data buffers;
   a plurality of readers, wherein the plurality of readers store data from the data source in the plurality of data buffers; and
   a plurality of writers wherein the plurality of writers write the data from the data source to the plurality of staging tables.

4. The system of claim 1, wherein the data synchronization application reads the data from the data source and stores the data into a plurality of data buffers on the server.

5. The system of claim 4, further comprising:
   a queue having a size equal to a number of the plurality of data buffers;
   wherein the plurality of data buffers are pushed into the queue; and
   a plurality of writers wherein the plurality of writers write the data from the data source to the plurality of staging tables wherein a number of the plurality of writers is the same as the number of the plurality of data buffers in the queue.

6. The system of claim 5, wherein a staging table is deleted when no data is found in the queue on the server.

7. The system of claim 1, wherein the server comprises an on-premise server or a server in a cloud environment having the cloud database.

8. A method for loading data to a cloud database, comprising:
   providing a data synchronization application on a server executing on a microprocessor;
   providing a plurality of staging tables in the cloud database;
   configuring a flush point for the plurality of staging tables, wherein a value of the flush point determines when to flush the data in the plurality of staging tables to a target table in the cloud database;

uploading, using the data synchronization application, data from an associated data source in a plurality of parallel streams to the plurality of staging tables in the cloud database, each of the plurality of streams corresponding to one of the plurality of staging tables;

setting a semaphore when each particular staging table of the plurality of staging tables reaches the configured flush point value;

triggering, with the semaphore, a transform and merge process to merge the data from said each particular staging table into the target table using a single process; and selecting the value of the flush point by the data synchronization application executing on the server for different invocations of the transform and merge process to provide adjustable size control of the data that is staged in each particular staging table to be transformed and merged into the target table.

9. The method of claim 8, wherein:
the semaphore is associated with the target table.

10. The method of claim 9, wherein uploading, using the data synchronization application, data from a data source in a plurality of parallel streams to the plurality of staging tables in the cloud database, comprises:
storing the data from the data source into a plurality of data buffers by a plurality of readers, and then uploading the stored data by a plurality of writers from the plurality of buffers to the plurality of staging tables.

11. The method of claim 8, wherein uploading, using the data synchronization application, data from a data source in a plurality of parallel streams to the plurality of staging tables in the cloud database, comprises:
storing the data from the data source into a plurality of data buffers by a plurality of readers.

12. The method of claim 11 further comprising:
providing a queue having a size equal to a number of the plurality of data buffers wherein the plurality of data buffers are pushed into the queue; and
uploading the stored data by a plurality of writers from the plurality of buffers to the plurality of staging tables.

13. The method of claim 12, further comprising deleting each staging table when no data is found in the queue on the server corresponding to said staging table.

14. The method of claim 8, wherein the server comprises an on-premise server or a server in a cloud environment having the cloud database.

15. A non-transitory computer readable storage medium, including instructions stored thereon that when read and executed by a computer system cause the computer system to perform a method for loading data to a cloud database comprising:
providing a data synchronization application on a server executing on the computer system;
providing a plurality of staging tables in the cloud database;
configuring a flush point for the plurality of staging tables, wherein a value of the flush point determines when to flush the data in the plurality of staging tables to a target table in the cloud database;
uploading, using the data synchronization application, data from an associated data source in a plurality of parallel streams to the plurality of staging tables in the cloud database, each of the plurality of streams corresponding to one of the plurality of staging tables;
setting a semaphore set when each particular staging table of the plurality of staging tables reaches the configured flush point value;
triggering, with the semaphore, a transform and merge process to merge the data from said each particular staging table into the target table using a single process; and
selecting the value of the flush point by the data synchronization application executing on the server for different invocations of the transform and merge process to provide adjustable size control of the data that is staged in each particular staging table to be transformed and merged into the target table.

16. The non-transitory computer readable storage medium of claim 15, wherein:
the semaphore is associated with the target table.

17. The non-transitory computer readable storage medium of claim 15, wherein uploading, using the data synchronization application, data from a data source in a plurality of parallel streams to the plurality of staging tables in the cloud database, comprises:
storing the data from the data source into a plurality of data buffers by a plurality of readers, and then uploading the stored data by a plurality of writers from the plurality of buffers to the plurality of staging tables.

18. The non-transitory computer readable storage medium of claim 15, wherein uploading, using the data synchronization application, data from a data source in a plurality of parallel streams to the plurality of staging tables in the cloud database, comprises:
storing the data from the data source into a plurality of data buffers by a plurality of readers.

19. The non-transitory computer readable storage medium of claim 18, the method further comprising:
providing a queue having a size equal to a number of the plurality of data buffers wherein the plurality of data buffers are pushed into the queue; and
uploading the stored data by a plurality of writers from the plurality of buffers to the plurality of staging tables.

20. The non-transitory computer readable storage medium of claim 19, the method further comprising:
deleting each staging table when no data is found in the queue on the server corresponding to said staging table.

* * * * *

UNITED STATES PATENT AND TRADEMARK OFFICE
CERTIFICATE OF CORRECTION

PATENT NO. : 11,966,410 B2
APPLICATION NO. : 17/397544
DATED : April 23, 2024
INVENTOR(S) : Ranganathan et al.

It is certified that error appears in the above-identified patent and that said Letters Patent is hereby corrected as shown below:

In the Specification

In Column 6, Line 53, delete "Wth" and insert -- With --, therefor.

In Column 7, Line 9, delete "217" and insert -- 217, --, therefor.

In Column 7, Line 30, delete "a a" and insert -- a --, therefor.

In Column 8, Line 53, delete "(laaS)." and insert -- (IaaS). --, therefor.

In Column 8, Line 60, delete "laaS." and insert -- IaaS. --, therefor.

Signed and Sealed this
Sixth Day of August, 2024

Katherine Kelly Vidal
Director of the United States Patent and Trademark Office